(12) United States Patent
Dawes et al.

(10) Patent No.: US 6,411,997 B1
(45) Date of Patent: Jun. 25, 2002

(54) METHOD OF DETERMINING THE TOPOLOGY OF A NETWORK OF OBJECTS

(75) Inventors: Nicholas Dawes; David Schenkel; Michael Slavitch, all of Ottawa (CA)

(73) Assignee: Loran Network Systems LLC, Willmington, DE (US)

( * ) Notice: Subject to any disclaimer, the term of this patent is extended or adjusted under 35 U.S.C. 154(b) by 0 days.

(21) Appl. No.: 08/749,671

(22) Filed: Nov. 15, 1996

Related U.S. Application Data

(63) Continuation-in-part of application No. 08/599,310, filed on Feb. 9, 1996, now Pat. No. 5,933,416, which is a continuation-in-part of application No. 08/558,729, filed on Nov. 16, 1995, now Pat. No. 5,926,462.

(51) Int. Cl.[7] .................. G06F 15/173; G06F 15/16
(52) U.S. Cl. .................. 709/224; 709/227; 709/228
(58) Field of Search ................ 709/228, 300, 709/301, 227, 224

(56) References Cited

U.S. PATENT DOCUMENTS

| | | | | |
|---|---|---|---|---|
| 5,182,750 A | * | 1/1993 | Bales et al. ............ | 370/110.1 |
| 5,430,729 A | * | 7/1995 | Rahnema ................. | 270/94.1 |
| 5,450,408 A | | 9/1995 | Phaal | |
| 5,608,659 A | * | 3/1997 | Lin et al. ................ | 364/554 |

FOREIGN PATENT DOCUMENTS

| | | |
|---|---|---|
| EP | 455402 | 6/1991 |
| EP | 0 265 106 | 11/1993 |
| WO | WO 94/19889 * | 9/1994 .......... H04L/12/26 |
| WO | WO 95/01030 | 1/1995 |
| WO | WO95/06989 | 3/1995 |
| WO | WO 96/13108 | 2/1996 |

OTHER PUBLICATIONS

IEEE Network, vol. 3, New York, XP002027616: Soha, M., "A Distributed Approach to LAN monitoring Using Intelligent High Performance Monitors", Jul. 1987.
IEEE Transactions on Communcations, vol. 42, New York, 1994. Yasuda, Y. et al., Automated Network Connection Tracing and Data Gathering Methods in the SDH Network.
IBM Technical Disclosure Bulletin, vol. 331, Armonk, 1988. (No author cited. Robust Method for Training Sequential Decision–Making for Artificial Intelligence System.

* cited by examiner

*Primary Examiner*—Zarni Maung
(74) *Attorney, Agent, or Firm*—Harold C. Baker; Robert A. Wilkes; Robert G. Hendry

(57) ABSTRACT

A method of determining a connection between a data emitting device and a network device which may carry the data, wherein the network device is comprised of a store for a data source address of a last frame transmitted to the network device and an input traffic count comprising (a) periodically reading the data source address, (b) periodically reading the input traffic count, (c) determining whether the data source address has always stayed the same, (d) in the event the data source address has always stayed the same, determine whether the traffic count has exceeded a predetermined threshold, (e) in the event the result of step (d) is true, indicate that the data source address identifies with acceptable probability a data emitting device directly connected to the network device.

3 Claims, 3 Drawing Sheets

METHOD OF DETERMINING THE TOPOLOGY OF A NETWORK OF OBJECTS

Figure 1:
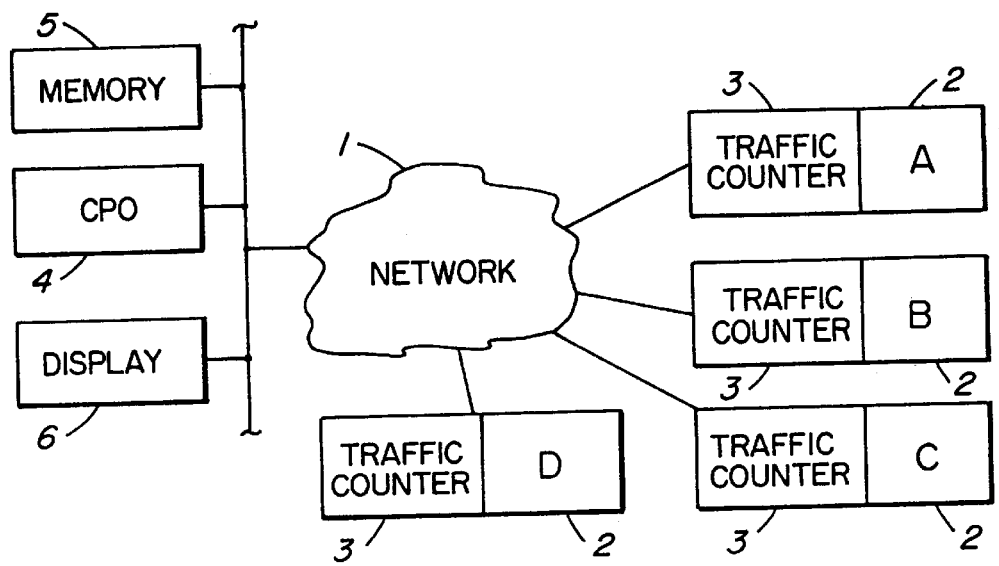

This is a continuation-in-part application of U.S. application Ser. No. 08/599,310 filed Feb. 9, 1996, now U.S. Pat. No. 5,933,416, which is a continuation-in-part of U.S. application Ser. No. 08/558,729 filed Nov. 16, 1995, now U.S. Pat. No. 5,926,462.

FIELD OF THE INVENTION

This invention relates to a method of determining the topology of a network of objects, such as the physical topology of a network of data communications devices.

BACKGROUND TO THE INVENTION

Operators of many data communications networks are typically ignorant of the exact topology of the networks. The operators need to know the exact topology in order to properly manage the networks, for example, for the accurate diagnosis and correction of faults.

Network managers that do know the very recent topology of their network do so by one of two methods: an administrative method and an approximate AI (artificial intelligence) method.

Administrative methods require an entirely up to date record of the installation, removal, change in location and connectivity of every network device. Every such change in topology must be logged. These updates are periodically applied to a data base which the network operators use to display or examine the network topology. However, in most such systems the actual topology information made available to the operators is usually that of the previous day or previous days, because of the time lag in entering the updates. This method has the advantage that a network device discovery program need not be run to find out what devices exist in the network. This method has a disadvantage that it is almost impossible to keep the data base from which the topology is derived both free of error and entirely current.

The approximate AI methods use routing/bridging information available in various types of devices, for example, data routers typically contain routing tables. This routing information carries a mixture of direct information about directly connected devices and indirect information. The AI methods attempt to combine the information from all the devices in the network. This method requires that a network device discovery program be run to find out what devices exist in the network, or that such a list of devices be provided to the program. These approximate AI methods require massive amounts of detailed and very accurate knowledge about the internal tables and operations of all data communications devices in the network. These requirements make the AI methods complex, difficult to support and expensive. In addition, devices that do not provide connectivity information, such as ethernet or token ring concentrators must still be configured into the network topology by the administrative method.

One major problem with the AI methods is that inaccurate or incomplete information can cause their logic to deduce incorrect conclusions. The probabilistic methods described here are far less vulnerable to such problems.

SUMMARY OF THE INVENTION

The present invention exploits the fact that traffic flowing from a first device to a second device can be measured both as the output from the first device and as the input to the second device. The volume of traffic is counted periodically as it leaves the first device and as it arrives at the second device. With the two devices being in communication, the two sequences of measurements of the traffic volumes will tend to be very similar. The sequences of measurements of traffic leaving or arriving at other devices have been found in general, to tend to be different because of the random (and fractal) nature of traffic. Therefore, the devices which have the most similar sequences have been found to be likely to be interconnected. Devices can be discovered to be connected in pairs, in broadcast networks or in other topologies. This method is therefore extremely general. Various measures of similarity can be used to determine the communication path coupling. However the chi squared statistical probability has been shown to be robust and stable. Similarity can be established when the traffic is measured in different units, at different periodic frequencies, at periodic frequencies that vary and even in different measures (e.g. bytes as opposed to packets).

In accordance with an embodiment of the invention, a method of determining the existence of a communication link between a pair of devices is comprised of measuring traffic output from one device of the pair of the devices, measuring the traffic received by another device of the pair of devices, and declaring the existence of the communication link in the event the traffic is approximately the same.

Preferably the traffic parameter measured is its volume, although the invention is not restricted thereto.

In accordance with another embodiment of the invention, a method of determining network topologies is comprised of monitoring traffic received by devices connected in the network and traffic emitted out of the devices, correlating traffic out of the devices with traffic into the devices, indicating a network communication path between a pair of the devices in the event that the correlation of traffic out of one of the pair of the devices and into another of the pair of the devices is in excess of a predetermined threshold.

An embodiment of the present invention has been successfully tested on a series of operational networks. It was also successfully tested on a large data communications network deliberately designed and constructed to cause all other known methods to fail to correctly discover its topology.

BRIEF INTRODUCTION TO THE DRAWINGS

Figure 2:
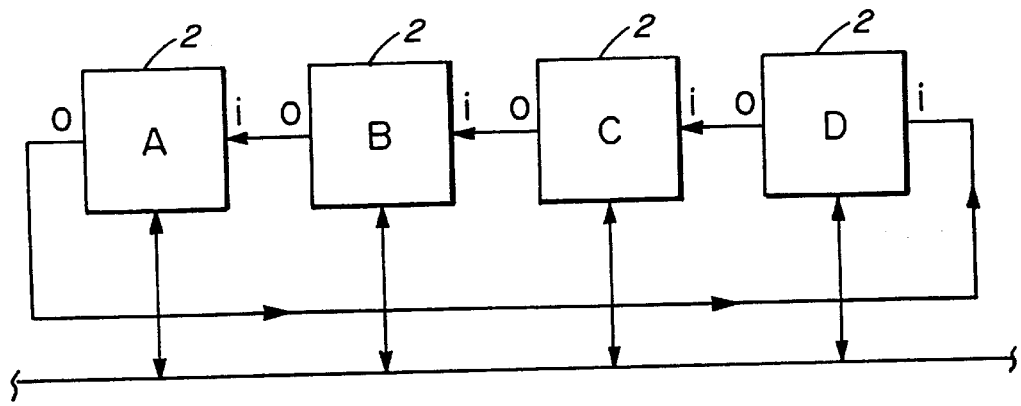
Figure 3:
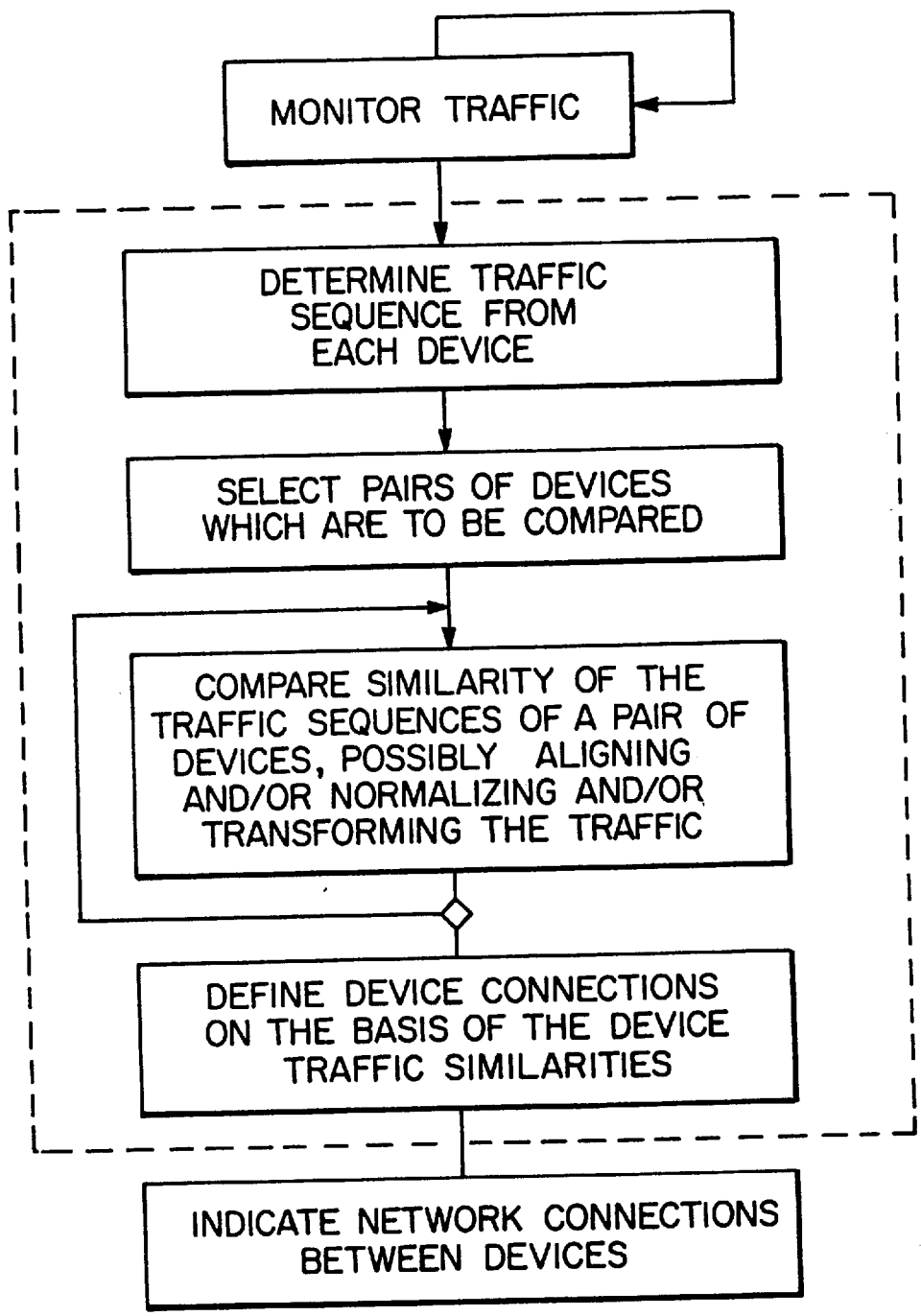
Figure 4:
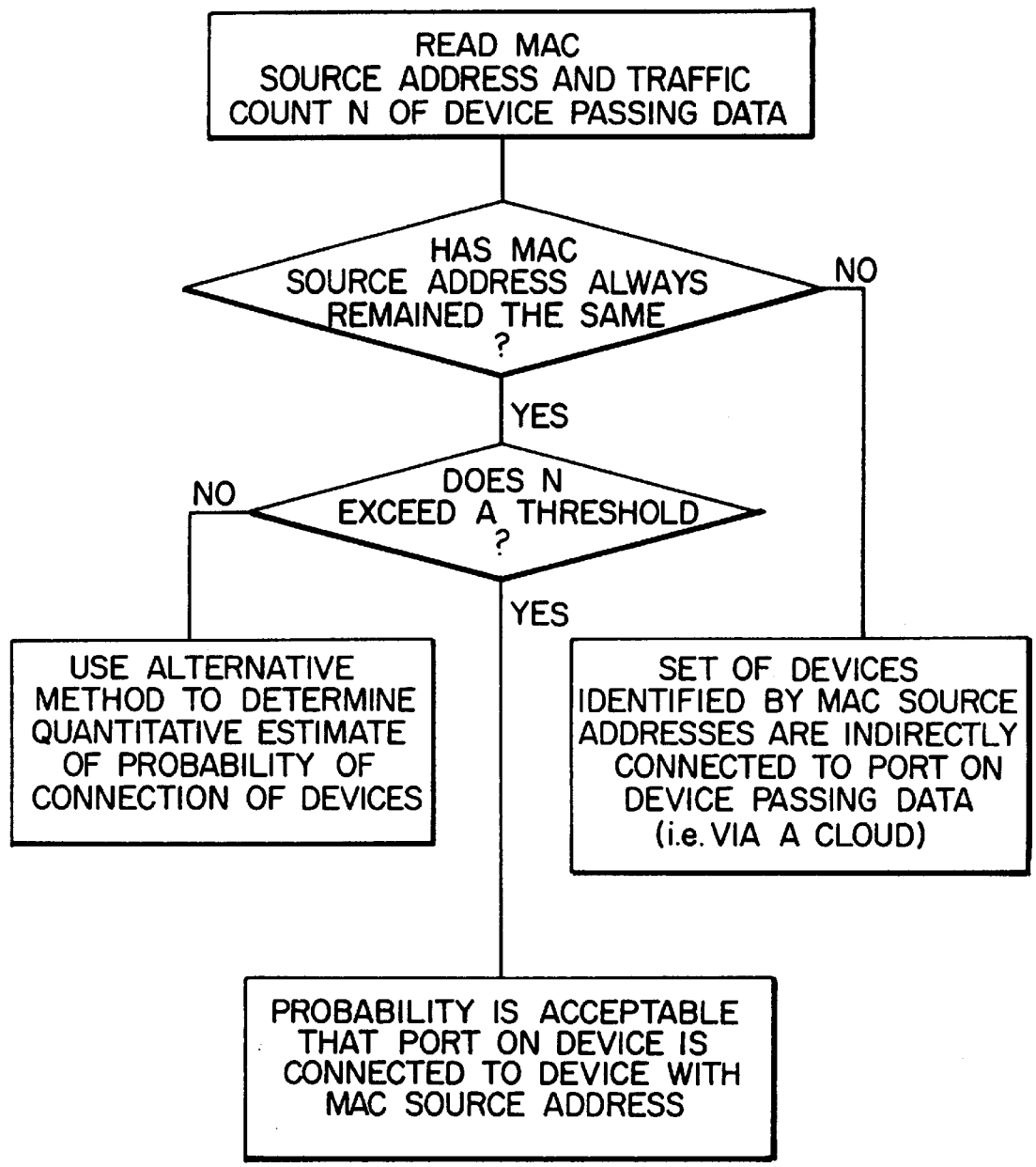

A better understanding of the invention will be obtained by reference to the detailed description below, in conjunction with the following drawings, in which:

FIG. 1 is a block diagram of a structure on which the invention can be carried out, FIG. 2 is a block diagram of a part of a network topology, used to illustrate operation of the invention, FIG. 3 is a flow chart of the invention in broad form, and FIG. 4 is a flow chart of an embodiment of the invention.

DETAILED DESCRIPTION OF THE PREFERRED EMBODIMENTS

The invention will be described by reference to its theory of operation, and then by practical example. However, first, a description of a representative network with apparatus which can be used to implement the invention will be described.

With reference to FIG. 1, a data communication network 1 can be comprised of devices such as various subnetworks, comprised of e.g. routers, serial lines, multiplexers, Ethernet™ local area networks (LANs), bridges, hubs, gateways, fiber rings, multibridges, fastpaths, mainframes, file servers and workstations, although the network is not limited to these elements. Such a network can be local, confined to a region, span a continent, or span the world. For the purposes of this description, illustrative devices are included in the network, and can communicate with each other via the network. Each of the devices contain a traffic counter 3, for counting the number of packets S it received and the number of packets it transmitted, since reset of the traffic counter. Each device can be interrogated to provide both its address and with its address a count, in the traffic counter, of the number of packets. A network of devices such as the above is not novel.

A processor comprised of CPU 4, memory 5 and display 6 are also connected to the network, and can communicate with each of the devices 2 (A, B, C and D) connected to the network.

FIG. 2 illustrates communication paths between each of the four devices 2, which paths are unknown to the system operator. The output o of device A transmits to the input i of device D, the output o of device D transmits to the input i of device C, the output o of device C transmits to the input i of device B, and the output o of device B transmits to the input i of device A. Each of the devices is also connected to the network 1, while any of the communication paths between the devices 2 may also be connected to the network 1 (not shown). However, the CPU can be in communication with each of the devices by other communication paths. In the examples described later the inventive method of discovering the communication paths, i.e. the topology of the part of the network between these devices will be used.

As a preliminary step, the existence and identity of each of the presumed devices that exist in the network is determined. Determination of the existence and identity of these devices is not novel, and is described for example in U.S. Pat. No. 5,185,860 issued Feb. 9th, 1993 and entitled AUTOMATIC DISCOVERY OF NETWORK ELEMENTS and which is assigned to Hewlett-Packard Company.

The invention will first be described in theoretical, and then practical terms with respect to the example network described above.

Each device in the network must have some activity whose rate can be measured. The particular activity measured in a device must remain the same for the duration of the sequence of measurements. The activities measured in different devices need not be the same but the various activities measured should be related. The relationships between the rates of the different activities in devices should be linear or defined by one of a set of known functions (although a variation of this requirement will be described later). An example of activities that are so related are percentage CPU utilization in a data packet switch and its packet throughput. It should be noted that the functions that relate different activity measures need not be exact.

The units (e.g. cms/sec or inches/min) in which an activity are measured can vary from device to device but must remain constant for the duration of the sequence of measurements.

This method of discovery does not depend on particular relationships between the intervals between collection of activity measurements and the rates of activity, except that should the activity rates be so low that few intervals record any activity, more measurements may need to be recorded to reach a certain accuracy of topological discovery.

This method of discovery does not depend on particular relationships between the intervals between collection of activity measurements and the transit time between devices except that should the intervals between measurements be much smaller than the transit time between devices, more measurements may need to be recorded to reach a certain accuracy of topological discovery.

The activity of the devices in the network should be measured in sequences. There are four aspects to such measurements: how to measure the activity, who or what measures activity, when to measure the activity and lastly transmitting the measurements to this method for determining network topology.

Measurements made be made in four ways:

a: directly from observations made inside the device:

b: directly from observations made of the device from outside:

c: computed from observations made inside the device:

d: computed from observations made of the device from outside.

Examples of these are as follows:

a: CPU utilization in a computer:

b: number of frames transmitted on a communications line, counted in a data router connected to this line:

c: number of packets transmitted per active virtual circuit in an data router:

d: temperature of an device computed from spectral observations.

All such activity which is measured should be construed in this specification as "traffic".

The activity can be then be expressed as any function or combination of functions of the four classes of observations.

For example, let the activity of an device be directly measured as the number of operations of a certain type that it has carried out since it was started. The computed measurement could be the difference between the number of such operations now and the number of such operations at the time of the previous measurement.

Measurements may be made by the device itself, by another network device, by a device external to the network or by a combination of devices internal and external to the network. Measurement devices are not restricted to electronic or mechanical means. Any mixture of measuring methods may be used. Different devices may be measured by different measuring methods from each other and such measuring methods may change with time for devices.

Activity can be measured at regular periodic intervals or at irregular intervals. Different devices in the network can have their activities measured in either way. Individual devices can use a mixture of methods. Sufficient temporal data must be collected or recorded at the time of each measurement of activity on each device to allow the time at which each measurement was made to be determined, either absolutely or with respect to some relative standard.

The accuracy with which the time needs to be recorded to achieve a certain level of performance of this method will vary from network to network.

The measurements of activity may be transmitted directly or indirectly from devices 2 to CPU 4 for processing to determine the network topology. The measurements may be made, stored and then retrieved, or may be transmitted directly, or transmitted by some mixture of these methods. The transmission of the measurements may use the inband or outband communications facilities of the network (should they exist for the network) or any other means of communication. These options permit the operation of the invention for topological discovery in realtime or later.

The network itself can be used to transmit the measurements and should this transmission affect activity as measured, then the operation of the invention can itself, on a network with very low activity, generate relatively significant activity. This can be exploited to improve the speed of discovery, to operate the method effectively during very inactive or quiet periods and for other advantages.

In its simplest form each device in the network is selected in turn. Let device 'a' have been selected. The sequence of measurements for this device 'a' is compared with the sequence of measurements for every other device. The device with the sequence of measurements most similar to that of 'a' is considered to be connected to 'a'.

There are several methods for restricting or indicating probably correct connections, as follows. These can generally be used in any combination.

(a) A proposed connection with a corresponding similarity measure with less than a chosen value can be rejected.

(b) Proposed connections are preferred to be displayed or indicated with some direct or indirect notification of the associated probability (e.g. green if more probable than a cutoff, yellow if less probable).

(c) The maximum similarity for any known to be correct connection after a given sequence length or time period can be recorded. Putative connections with similarity less than this empirical level should be considered invalid and should not be included in the proposed network topology.

(d) Some devices will be connected in a broadcast or other manner, such that they are apparently or actually connected to more than one other device. Should this be considered a possibility for the network in question, the following extra sequence should be used once the suggested pair connections have been determined:

Let device 'a' be assessed as being connected to device 'b'. Should the similarity measure between device 'a' and a further device 'c' be probably the same as the similarity measure between device 'a' and device 'b', then device 'a' should be considered as being connected to both device 'b' and device 'c'. This search for extra connections could be unrestricted (e.g. allowing all devices in the network to be connected together) or restricted by a number (e.g. allowing no more than 48 devices ever to be connected together).

Once the measurements for a pair of devices have been made (either they are complete or at least 1 measurement has been made on each device), the two sequences of activity of the two devices can be compared. The two sequences of measurements may need to be time aligned, functionally mapped and normalized before having their similarity computed.

The following definitions are used below, in this specification:

A: a measure of the quantity of activity that has passed since the previous measure was reported by this device. $A(j,1)$ is the first measurement made for device j.

Activity: some operation or combination of operations in or including an device. The rate of such operations must be measurable.

Activity sequence: a series of measurements of activity rates made at recorded variable intervals or at fixed periodic intervals for a device.

Class: a device may belong to one or more classes (e.g. bridges, routers)

Discovery: the determination of what devices exist in the network, but not how they are connected.

$g_s(x)$: a functional transform of the value of the measure of activity x. The subscript s indicates which from a possible set of transform functions is being used.

G: the total number of different transform functions in the set $g_s$.

L: the number of measurements in two sequences that are to be compared.

N: there are N devices in the network.

Physical or Logical Device: an device can be physical or logical. The network consists partially or entirely of devices that can be located in the network. Each device that can be located must have some measurable activity and this activity should be related to some measurable activity of the device or devices connected to this device.

$S(a,b)$: the similarity of device b compared to device a.

Sequence length: the number of measurements of activity made in a given activity sequence.

Similarity: an arithmetic measure of likelihood that two activity sequences have been measured from devices that are connected together (see S). Likelihood increases as the similarity measure increases.

Sum: $Sum(j)$ is the sum of the activity measurements in a sequence for the device (j).

T: a transformed measure of the volume of activity that has passed since the previous measure was reported by this device. $T(j,i)$ is the i'th measurement made for device j, transformed by the function chosen from the set g.

T*: $T^*(j,i)$ is the normalized i'th measurement made for device j such that over L measurements, the sum of $T^*(j,i)$=the sum of $T(k,i)$ for same reference device k.

Topology: how the devices in the network are connected.

x: $x(j,i)$ is the value of the i'th time aligned activity measurement for device j.

y: $y(j,i)$ is the value of the ilth activity measurement for device j.

Device: an input or output communications port of a physical or logical device. Each device that can be located must be able to measure and report some measure of the traffic or activity at this port, or to have such a measurement made on it and reported (eg: by an external agent).

Device index: the letter j indicates which device (1 ... N) is being referred to.

Device suffix: the suffix i indicates the input side (traffic arriving at this device). The suffix o indicates the output side (traffic leaving this device).

Discovery machine: the machine, possibly connected to the network, that is running the method.

j: the letter j indicates which device (1 ... N) is being referred to.

+x+:x is the name of a device. For example, +b+ described the device b.

fom: a figure of merit that describes similarity.

Q: the probability of similarity.

$V^*(a,i)$: the variance of the normalised $T^*(a,i)$

SNMP: Simple Network Management Protocol.

NMC: Network Management Centre.

Ariadne: an embodiment of the invention is termed Ariadne.

$D(a,b)$: a difference measure between the mean traffic from device a and the mean traffic from device b.

port: a device may have more than one communications interface, each such interface on a device is termed a 'port'.

MIB: Management information base. A set of monitored values or specified values of variables for a device. This is held in the device or by a software agent acting for this device, or in some other manner.

Polling: sending an SNMP request to a specified device to return a measure (defined in the request) from the MIB in that device. Alternatively the information can be collected or sent periodically or intermittently in some other manner.

Traffic sequence: a series of measurements of traffic rates or volumes made at recorded variable intervals or at fixed period intervals for a device (input or output).

The following describes how sequences of measurements made at possible varying periodic intervals and at possibly different times for two different devices can be time aligned. This alignment, necessary only if the activity measures vary with time, can greatly improve the accuracy of determining which devices are connected to each other, given a certain number of measurements. It can correspondingly greatly reduce the number of measurements needed to reach a certain level of accuracy in determining which devices are connected to each other. The method is carried out by CPU 4, using memory 5.

The measurements from the sequence for device b (ie:y(b,i)) are interpolated and, if necessary, extrapolated, to align them with the times of the measurements in the sequence for device a (i.e.: y(a,i)). This interpolation can be done using linear, polynomial or other methods: e.g.: natural cubic splines, for example as described in W. H. Press, S. A. Teukolsky, B. P. Flannery, W. T. Vetterring: "Numerical Recipes in Pascal. The Art of Scientific Computing": Cambridge University Press, 1992, and C. E. Froberg: "Numerical Mathematics: Theory and Computer Applications": Benjamin Cummings, 1985. The interpolation will be more accurate if the form of the function used for the interpolation more closely follows the underlying time variation of the activity in device +b+.

However interpolation can very largely be avoided by the following method.

Let M(a) be the mean value of the traffic in the first X sampling periods for device a. Sort the list M(a) (e.g. using Heapsort which is NlogN in computational complexity). Now arrange that the devices be polled in the sequence given by the sorted list M(a). Since devices with very similar mean values of traffic will be polled with very small relative offsets in time, the degree of interpolation is very radically reduced.

Should the measurements in +b+ be started after those in +a+, the measurements in the +b+ sequence generally cannot be safely extrapolated backwards a time greater than the average time between measurements in the +b+ sequence. Similarly, should the measurements in +b+ stop before those in +a+, the measurements in the +b+ sequence generally cannot be safely extrapolated forward a time greater than the average time between measurements in the +b+ sequence. In some cases extrapolation beyond one or other end may reduce the accuracy of the method. In other cases extrapolation beyond one or other end may improve the accuracy of the method.

L (the number of measurements to be used in comparing the two sequences) is the number of measurements in the sequence of device +a+ that have corresponding interpolated or extrapolated time aligned measurements in the sequence for device +b+. The aligned data is copied into the arrays x(b,1 . . . L) and x(a,1 . . . L) for devices 'b' and 'a' respectively.

Comparison between two activity sequences is only done once the measurements in each sequence have been first transformed and then normalized. The transform process permits different types of measure of activity to be compared even though they are not linearly related. The normalization process permits linear related measures of activity to be compared, regardless of the units they are measured in.

The transform function for the sequence from device +a+ is chosen from the set g. The transform function for the sequence from device +b+ is chosen from the set g. For each possible combination of such functions, the resulting sequences are then normalized as described below and then are compared as will be described below. Since there are G functions in the set g, this means that $G^2$ such comparisons will be carried out.

For a chosen function $g_s$ from the set g:

$T(j,i)=g_s(x(j,i))$

The set g will generally contain the linear direct transform function:

$g_1(x)=x$

Other functions may be added to this set g should they be suspected or known to exist as relationships between different activity measures. For example, should activity measure y be known to vary as the log(x) for the same device, the following two functions would be added to the set g.

$g_2(x)=\log(x)$
$g_3(x)=\exp(x)$

The sum of all the traffic measurements T(b,1 . . . L) in the sequence for device +b+ is adjusted to equal the sum of all the traffic measurements T(a,1 . . . L) in the sequence for device +a+. This corresponds to normalizing the sequence T(b,i) with respect to T(a,i). This automatically compensates for differences in units of measure. It also automatically compensates for linear functional differences between the activities that may be measured on device +a+ and device +b+.

In detail, for i=1 . . . L:

$T^*(b,i)=T(b,i) \text{ Sum}(a)/\text{Sum}(b)$
$T^*(a,i)=T(a,i)$

The similarity between T*(a,i) and T*(b,i) for the range of i=1 . . . L is determined as follows. In other words, the probability that the two observed sets of data are drawn from the same distribution function is determined. The similarity can be established by a wide variety of similarity measures. Any statistical measure or test of similarity between two single measurements, between a time series of measurements or of the distribution of values in two sets of measurements could be used. The robustness and effectiveness of particular similarity measures will vary with the network topology, the patterns of activity in the network and on the forms of the measures. An incomplete list of such measures is least squares, chi-squared test, Student's t-test of means, F-test on variance, Kolmogorov-Smirnov test, entropy measures, regression analysis and the many nonparametric statistical methods such as the Wilcoxon rank sum test. Various forms of such measures are described in H. O. Lancaster: "The Chi-Squared Distribution", Wiley, 1969, R. L. Scheaffer, J. T. McClave: "Statistics for Engineers", Duxbury, 1982, and R. von Mises: "Mathematical Theory of Probability and Statistics", Academic Press, 1964.

One of the most widely used and accepted forms of such similarity comparison is the chi-squared method, and is suitable for discovering the topology of many types of networks. So, by way of example using the chi-squared measure:

To compute S(a,b)=chi-squared probability that the sequence for +b+ (T*(b,i), i=1 . . . L) is drawn from the same distribution as the sequence as +a+ (T*(a,i), i=1 . . . L).

let:

$$Q = \Sigma[(T^*(a,i)-T^*(b,i))^2/(T^*(a,i)+T^*(b,i))] \text{ for } i=1 \ldots L \quad\quad 1$$

and let all L measurements in both $T^*(a,i)$ and $T^*(b,i)$ (for $i=1 \ldots L$) be nonzero; then we have L−1 degrees of freedom (because the two sequences were sum normalized): giving, for this example:

S(a,b)=incomplete gamma function (Q. L−1)
(or the chi-squared probability function)

It should be noted that the similarity measure has been defined to increase as the likelihood of the two devices being connected increases. This means that a similarity measure such as least squares would be mapped by, for example:

$$S(a,b) = \Sigma(T^*(a,i) - T^*(b,i))^2$$

The incomplete gamma function used for chi-squared probability calculation is described in, for example, H. O. Lancaster: "The Chi-Squared Distribution", Wiley, 1969.

It should be noted that we are comparing two effectively binned data sets so the denominator in equation 1 approximates the variance of the difference of two normal quantities.

The method described above requires every device to be compared to every other device twice, using the full sequence measured so far. This means the computational complexity (for N devices, with L measurements for each but assuming G=1) is:

complexity is proportional to: $N^2L$.

In practice some measurements of $T^*(a,i)$ or $T^*(b,i)$ may not be available or considered corrupt. Let $L^*$ be the number of valid measures of $T^*(a,i)$ and $T^*(b,i)$ that a and b share in the sequence $i=1 \ldots L$. Then the assessment of the probability will use ($L^*-1$) degrees of freedom instead of (L−1) degrees of freedom.

The following variations in design can improve the efficiency of the method. The improvements will depend on the network, the devices in it, the activities measured and their distributions with respect to time. The variations can be used in a great variety of combinations.

(a) Curtail Search Once a Reasonable Fit has been Found.

Once a connection to device +a+ has been found that has a probability greater than the cutoff, do not consider any other devices. This applies to non-broadcast type connections.

(b) Do not Consider Devices Already Connected.

Devices that already have an acceptable connection found should not be considered in further searches against other devices. This applies to non-broadcast type connections.

(c) Curtail Comparison of Sequences Before L is Reached.

During the determination of the similarity of +a+ to +b+ should it already be certain that the final estimate of this similarity be less than a cutoff, discontinue this determination. This cutoff would either be the best similarity already found for this device 'a', or the minimum. Not all similarity measures are amenable to this curtailment.

(d) Examine Similar Devices First.

The order in which devices are compared to devices +a+ can be set so that those devices with some attribute or attributes most similar to +a+ are checked first. For example, in a TCP/IP data communications network one might first consider devices which had IP addresses most similar to device 'a'.

(e) Restrict Search by Class.

In many networks devices can only connect to a subset of other devices, based on the two classes of the devices. Therefore, should such class exclusion or inclusion logic be available and should the classes of some or all devices be known, the search for possible connections can be restricted to those devices that may connect, excluding those that may not.

The classes to which devices can connect can, for some devices (e.g.: data communications routers), be extracted from the device itself.

(f) Use Fewer Measurements.

Should the method be operated with only a subset of the measurements, complexity is reduced. Should an acceptable connection be found to an device, it need not be considered with a larger number of measurements. This subset of the sequence of measurements can be made such that the subset is not sequential in the list of measurements, nor need its start or end coincide with that of the original full set of measurements.

(g) Use Fewer Measurements to Start ith.

The variation of (f) could be used to create a short list of possible connections to each device using a few measurements. Only devices on this list will even be considered as candidates for connection to this device using a large subset or the full set.

(h) Discovering the Network in Parts.

The network topology may be known to exist in portions. These portions may each only have one or a few connections between them. The devices in each portion can be assigned a particular class and devices only within the same portion class considered for connection to each other. Each portion of the network could then be connected to others by connections discovered in a separate pass or discovered in another way (e.g. administratively) or by other information. This variation in the method reduces the computational complexity by reducing the effective N (number of devices) to be compared to each other.

(i) Discovering the Network in Parts in parallel.

The method can be run simultaneously or serially on more than one system. Each system can be responsible for discovering part of the network. The parts could then be assembled together.

(j) Using a Multiprocessor System.

The method can be operated in parallel. Each of a number of processors could be assigned a portion of the similarity calculations (e.g.: processor A is given devices 1–10 to be compared to all other devices, processor B is given devices 11–20 to be compared to all other devices and so on).

(k) Using the Devices to Perform the Calculation for Themselves.

The devices themselves, should they be capable of such processing, could be given the activity sequences of all devices or a subset of the devices. Each device then assesses for itself the devices to which it is connected. It would, as appropriate, report this to one or more sites for collection of the network topology.

The subset of devices for which an device might restrict its search could be generally those within a given class. Such a class might be defined by being within a certain time of flight, or being with a certain subset of labels.

The traffic sequences need not be time aligned and normalized other than by the device itself (e.g.: it could take a copy of the activity measurements as they are transmitted, perhaps restricting its collection of such measurements to devices within a certain class).

(l) When L is the same for all sequences, the incomplete gamma function need not be evaluated for comparisons of all devices B with respect to each device A. Since the incomplete gamma function is monotonically related to the value of Q (given fixed L), the device B with the lowest value of Q will necessarily have the highest associated chi-squared probability. Therefore the incomplete gamma function need only be computed for the best fitting device to each device A.

(m) Should a probability cutoff be applied, such that a sufficiently improbable connection will not be considered viable, this probability cutoff can be reexpressed in terms of Q for each possible value of L. this, coupled to method (1), further reduces the number of evaluations of the incomplete gamma function.

Appropriate probability cutoffs for each L* can be precomputed once to give appropriate Q cutoffs for each L*.

(n) The incomplete gamma function (Q,L*-1) is constant when Q=L*1. Therefore a cutoff of probability independent of L* can be made by rejecting all comparisons for which (Q/(L*-1))>1.

(o) Let Z=(Q/(L*-1)).

This ratio Z provides a useful approximate measure such that, for large enough and close enough *(a,b) and L*(a,c):

if Z(a,b)<Z(a,c) then it is more probable that a is connected to b than a is to c.

This technique allows for an approximate method that never evaluates the incomplete gamma function, by selecting for consideration only sequences which are both long enough (have enough data points) and are complete enough (have enough valid data points).

(p) Summary of Computational Improvements.

The impact of the variations above can reduce the complexity enormously. For example, in data communications networks the use of variations (a), (b), (c) and (g) in combination has been observed to reduce the complexity to be approximately linear in N (the number of network devices) and to be invariant with L (the total number of measurements made on each device). This was true both in a very broadcast oriented network and in a very pair-wise connected network.

The application of the method to a particular problem of discovering the topology of a particular class of data communications networks will now be described. The mapping of the general theory onto this particular application is performed primarily by replacing the general concepts of devices and activity by devices and traffic respectively. However, this particular data communication network is assumed to collect measurements using polling.

There are three main steps to this embodiment of the invention: discovering the devices in the network, collecting sequences of measurements of the traffic from the devices and comparing these sequences to determine which devices are connected together. This can be carried out by CPU 4 with memory 5.

A particular class of data communications networks have the following characteristics:

a: its measurements are requested by polling using inband signalling, b: its measurements are returned using inband signalling, c: polling is performed preferably every 60 seconds, d: a single machine (e.g. CPU 4 with memory 5) operates the method for determining the topology. This machine also performs the polling of the devices 2 and receives the polling replies from the devices, and e: all devices of interest in the network can have their traffic measured.

The existence and network addresses can be determined by the administrative method described above, or by automated methods, such as described in U.S. Pat. No. 5,185,860, referred to above.

In a successful prototype of the invention a time indication from 0 . . . 59 was randomly allocated to each device in the network. This time defined how many seconds after the beginning of each minute the discovery machine should wait before sending a device its request for the total traffic measured so far. Of course, these requests are interleaved so that in a large network many requests should be sent out each second. All devices will therefore get a request every minute and this request (for a device) will be sent out very nearly at one minute intervals. The reason the times should be randomly allocated is to smooth out the load on the network, since inband signalling was used.

Each device 2 on receipt of a poll should extract the value of the variable requested from the traffic counter 3 (the total traffic since reset, measured in packets) and should send this back preferably in an SNMP format packet to the discovery machine. On receipt, the address of the device 2, the time of arrival of this information is stored along with the value of the counter, indexed for this device. The new value of the counter is subtracted from the previous one in order to compute the total traffic measured in the last minute, not the total since that device was reset. In this way a sequence of traffic measurements for all the devices in parallel is built up and stored in memory 5.

Before two traffic sequences (for device +a+ and device +b+) can be compared, they are time aligned, functionally mapped and then normalized as described earlier. The measurements from the second sequence (b) are interpolated to align them with the times of the measurements in the first sequence (a). Since the only function for mapping considered in this example is the direct linear mapping, no functional mapping is performed on any measurements.

For normalization, let the shorter of the two sequences have length L. The sum of all the traffic measurements 1 . . . L in the sequence for device +b+ is adjusted to equal the sum of all the traffic measurements 1 . . . L in the sequence for device +a+. This corresponds to normalizing the sequence T(b,i) with respect to T(a,i).

The chi-square probability comparison of the sequences computes the similarity. S(a,b)=chi-squared probability that the traffic sequence for +b+ (T*(b,i), i=1 . . . L) is drawn from the same distribution as the traffic sequence for +a+ (T(a,i), i=1 . . . L).

The device +x+ with the highest value of S(a,x) is the one most probably connected to +a+.

A probability cutoff (threshold) of a minimum value of F can be applied. If the highest value of S(a,x) is less than this cutoff, that means that device +a+ has no device considered to be connected to it after a certain number of polls. A suitable such cutoff, for a network with N devices, might be 0.01/N, given perhaps more than 10–15 measurements of traffic on each device.

As indicated above, a number of the devices in the network may be connected in broadcast mode: i.e. they may be apparently or actually connected to more than one other device. The logic described above can therefore be applied. For example, any device +a+ can be considered to be connected to all devices z for which S(a,z) is greater than some cutoff.

A variety of similarity measures from the possible list described earlier were experimentally tested. These tests were carried out on a simulated network of 2000 devices and also on data collected from a real network, which had over 1500 devices. The first was connected pairwise, and the second network had a mixture of broadcast and pairwise connections.

The measure of similarity which required fewest average measurements to produce the correct topologies was:

$S(a,b)=\Sigma[(T^*(a,i)-T^*(b,i))^2/(T^*(a,i)^2)]V^*(a,i)/Li=1 \ldots L$

This similarity measure was better than the chi-squared probability, likely for the following reasons. The chi-squared measure assumes that traffic measurements are normally distributed, which may not be true. The chi-squared difference, as computed in equation 1 above has $T^*(b,i)$ as well as $T^*(a,i)$ in its denominator. This means that should the device 'a' have a very flat sequence and device 'b' have a flat sequence with just one spike in it, at the point of comparison of the spike to the flat sequence the chi-squared difference may understate the significance of the spike.

It was also observed that the chi-squared difference divided by L or by L−1 was as effective and required much less CPU time than the chi-squared probability. In other words, the calculation on the incomplete gamma function to compute the probability associated with the chi-squared difference was, for these cases, unnecessary and very expensive in CPU time.

Thus it appears clear that selection of the appropriate similarity measure can improve performance (speed and accuracy of topological recognition) on different types of networks.

In data communications networks traffic has random and fractal components. The random nature of the traffic means that over a short period of time the traffic patterns between two devices will tend to differ from the traffic patterns between any two other devices. In other words, when measured over several intervals, the random nature will tend to provide differentiation in the absence of any other distinguishing underlying difference. However, should the periods between measurements be very long and the mean traffic rates between pairs of devices tend to be similar, it is the fractal nature of the traffic that will now help ensure that the patterns of traffic between pairs of devices will tend to be significantly different, again in the absence of any other distinguishing underlying difference. The fractal nature of traffic (as described by W. E. Leland, W. Willinger, M. S. Taqqu, W. V. Wilson in: "On the Self-Similar Nature of Ethernet Traffic": ACM SIGCOMM, computer Communication Review, pp 203–213, January 1995) means that the volume of traffic on a particular link can be correlated to the volume traffic earlier on that link. This correlation will, in general, be different for every such link.

Returning to the example network described above with reference to FIG. 2, there are four devices 2 being monitored in the network: A, B, C and D. Each device generates and receives traffic. This means the input rate on each device is not simply related to the output rate on the same device. The network is polled in this example using inband signalling. The chi-squared probability has been chosen for the similarity measure.

In the network:

Ai connects to Bo.

Bi connects to Co.

Ci connects to Do.

Di connects to Ao.

The preliminary network discovery program is run and returns with the 8 port addresses for these four devices.

The 8 addresses found are sent polls at the end of each minute, for 5 minutes, asking for the value of the variable that measures the total traffic transmitted (in packets) since reset for this device. Notice that the devices were reset at somewhat different times in the past, so they have different starting counts. However, also note that all the traffic measurements are already time aligned, so no interpolation is required. This corresponds to the monitoring traffic step in the flow chart of FIG. 3.

| i = | 1 | 2 | 3 | 4 | 5 |
|---|---|---|---|---|---|
| 1: $A_i$ | 1 | 3 | 6 | 10 | 15 |
| 2: $A_o$ | 11 | 13 | 14 | 15 | 16 |
| 3: $B_i$ | 22 | 24 | 27 | 29 | 30 |
| 4: $B_o$ | 11 | 13 | 16 | 20 | 25 |
| 5: $C_i$ | 2 | 4 | 7 | 11 | 15 |
| 6: $C_o$ | 2 | 4 | 7 | 9 | 10 |
| 7: $D_i$ | 11 | 13 | 14 | 15 | 16 |
| 8: $D_o$ | 42 | 44 | 47 | 51 | 55 |

The change in traffic over the last minute is now computed, obviously only for minutes 2, 3, 4 and 5.

| i = | 2 | 3 | 4 | 5 |
|---|---|---|---|---|
| 1: $A_i$ | 2 | 3 | 4 | 5 |
| 2: $A_o$ | 2 | 1 | 1 | 1 |
| 3: $B_i$ | 2 | 3 | 2 | 1 |
| 4: $B_o$ | 2 | 3 | 4 | 5 |
| 5: $C_i$ | 2 | 3 | 4 | 4 |
| 6: $C_o$ | 2 | 3 | 2 | 1 |
| 7: $D_i$ | 2 | 1 | 1 | 1 |
| 8: $D_o$ | 2 | 3 | 4 | 4 |

The similarity for each of the 8 addresses with respect to the other 7 (considered as 8 devices) is now computed (the correlation step of FIG. 3). It is obvious in this simple example that the devices connected to each other have exactly the same sequences. However, in detail let us examine the comparison of Ai with Di. No time alignment is needed.

EXAMPLE 1

$S(A_i, D_i)$

1: They both have length 4 (i.e. four time differences) so the length to be used in comparison is 4.

2: The sum of the traffic values of Ai=14. The sum of the traffic values of Di=5. The normalized traffic values of Di are now:

| i = | 2 | 3 | 4 | 5 |
|---|---|---|---|---|
| T* | 5.6 | 2.8 | 2.8 | 2.8 |

3: The values for Ai are still:

| i = | 2 | 3 | 4 | 5 |
|---|---|---|---|---|
| T* | 2 | 3 | 4 | 5 |

4: The chi-squared is computed as follows:

$$\text{chi-squared}=(2-5.6)^2/(2+5.6)+(3-2.8)^2/(3+2.8)+(4-2.8)^2/(4+2.8)+(5-2.8)^2/(5+2.8)$$

chi-squared=2.59

5: There are 3 degrees of freedom for the chi-squared probability calculation as there are 4 points compared and the second set of points was normalized to the first (removing one degree of freedom).

The incomplete gamma function (chi-squared, degrees of freedom) can now be used with (2.59, 3) to give:

S(Ai,Di)=0.4673

EXAMPLE 2

$S(A_i, B_o)$

1: They both have time difference length 4 so the length to be used in comparison is 4.
2: The sum of the traffic values of Ai=14. The sum of the traffic values of Bo=14. The normalized traffic value of Bo are now:

| i = | 2 | 3 | 4 | 5 |
|---|---|---|---|---|
| T* | 2 | 3 | 4 | 5 |

3: The values for Ai are still:

| i = | 2 | 3 | 4 | 5 |
|---|---|---|---|---|
| T* | 2 | 3 | 4 | 5 |

4: The chi-squared is computed as follows:

$$\text{chi-squared} = (2-2)^2/(2+2) + (3-3)^2/(3+3) + (4-4)^2/(4+4) + (5-5)^2/(5+5)$$

chi-squared=0.0

5: There are 3 degrees of freedom for the chi-squared probability calculation as there are 4 points compared and the second set of points was normalized to the first (removing one degree of freedom).

The incomplete gamma function (chi-squared, degrees of freedom) can now used with (0.0, 3) to give:

S(Ai,Bo)=1.0

The following table gives the similarity measures for the different devices being compared to each other. Notice the asymmetry caused by the sum normalization.

|     | Ai | Ao | Bi | Bo | Ci | Co | Di | Do |
|-----|------|------|------|------|------|------|------|------|
| Ai: |        | 0.4673 | 0.4538 | 1.0000 | 0.9944 | 0.4538 | 0.4673 | 0.9944 |
| Ao: | 0.8233 |        | 0.9069 | 0.8233 | 0.8527 | 0.9069 | 1.0000 | 0.8527 |
| Bi: | 0.6828 | 0.8288 |        | 0.6828 | 0.7716 | 1.0000 | 0.8288 | 0.7716 |
| Bo: | 1.0000 | 0.4673 | 0.4538 |        | 0.9944 | 0.4538 | 0.4673 | 0.9944 |
| Ci: | 0.9950 | 0.5632 | 0.6096 | 0.9950 |        | 0.6096 | 0.5632 | 1.0000 |
| Co: | 0.6828 | 0.8288 | 1.0000 | 0.6828 | 0.7716 |        | 0.8288 | 0.7716 |
| Di: | 0.8233 | 1.0000 | 0.9069 | 0.8233 | 0.8527 | 0.9069 |        | 0.8527 |
| Do: | 0.9950 | 0.5632 | 0.6096 | 0.9950 | 1.0000 | 0.6096 | 0.5632 |        |

It may be seen that the correlation 1.000 is the highest correlation value, and can be extracted (e.g. by setting a threshold below it but above other correlation values) to indicate on display 6 the network topology connecting the device whose addresses are in the rows and columns intersecting at the correlation 1.000. These, it will be noted, correspond exactly to the table of interconnections of devices which was given earlier. The display can be e.g. in table form, in graphical map form, or whatever form is desired. This corresponds to the indication step in FIG. 3.

It should be noted that devices need not have both input and output sides and these sides can be combined. The traffic may be retrieved by methods other than polling, for example by a proxy agent (a software agent). The information could be sent autonomously by devices (as in the OSI network management protocol). A mixture of polling and autonomous methods can coexist.

The network topology can be determined after time T and then again at T+dt. Should there be no changes in the topology the operator could be informed of this, which indicates that a stable solution has been found. Should a stable solution be found and then change, that indicates that an device has moved or that something has broken or become faulty. The particular change will help define this.

In router dominated data network, port tracer packets can be sent to devices and will return with the sequence of router devices they passed through. This can be used to partially verify that the topology is correct. It could also be used to help establish the functional relationships between measured activities.

This method can in general use just one measure of activity per device. All the measurements on the different devices would have to be made sufficiently close in time that the activities would not change significantly during the interval taken to take all the measurements (should they not be made in parallel). Should only one measure of activity be made, sum normalization and time normalization should not be applied.

The three processes (discovery of what devices are in the network, collecting measures of activity and computing the topology) in the method can run continuously and/or in parallel. This allows changes in topology (e.g. breaks) to be detected in real time.

It was indicated earlier that the method works if the function relating different activities was known, at least approximately. However, one could operate this method in order to discover such a function, knowing at least one or more of the correct connections. The rest of the network topology, or just the function (or functions) or both can thereby be found. The entire topology discovery method is then used with an initial estimate of the possible function set $g_s$. The resulting topology is then compared to the known topology (or subset if that was all that was known). The estimates of the possible functions are then changed and the method repeated. In this way the estimate of the possible functions can be optimized.

A second variation on this approach does not rely on any prior knowledge of the network. The mean probability of the suggested connections are considered as the parameter which is optimized, rather than the number of correct connections. Other variations using either a mixture of probability and correct counts, or functions of one or both can be used.

The network could alternatively be partially defined and then the method used to complete the rest of the topology.

The frequency of measurements can be adapted so that the communications facilities (inband or outband or other) are not either overloaded or not loaded above a certain level. This allows use of this method in a less intrusive manner.

Instead of only one activity being measured per device, several or many dimensions of activity can be measured. In this case the activity sequences are multi-dimensional. The discovery of the network topology can be executed in parallel, one discovery for each dimension. The resulting network topologies from the different dimensions can then be fused, overlayed, combined or used for other analysis (such as difference analysis for diagnosis). Alternatively the activity measures can be made multi-dimensional and the topology found using this multi-dimensional measure, rather than the uni-dimensional one described. The relative weight of the different dimensions can be adjusted statically or dynamically to attempt to achieve performance goals.

The present method can be used in combination with the AI method for several purposes. It could check that the routing or other tables used by the AI method and extracted by the AI method from network devices were consistent. For example, perhaps two physical communications lines may be available for one city to another, and both are connected, but only one may have been entered into the router tables. The present invention can detect this discrepancy.

Differences between the topologies found by this method and by the administrative method could be used to detect unauthorized additions or changes to the network. Differences could be tracked for other purposes.

The network operator could restrict the network topology discovery to devices with levels of activity above a certain level, as well as performing the general topological discovery (perhaps earlier or later).

In a data communications network the present method could be used to find the sources and sinks of unusually high traffic levels, such as levels that may be causing intermittent problems. This knowledge could alternatively be used to assist network configuration and planning (e.g. placing matched pairs of sources and sinks locally or by adding communications capacity).

In other types of networks this selection of the busiest devices would show the major operations and topology of the network (e.g. heart, major arteries and major veins), without worrying about perhaps irrelevant minor details (e.g. capillaries).

A series of such investigations with different cutoff levels of activity could be used to identify the major busy and less busy regions of the network, again for planning, model discovery or diagnosis.

A series of constraints can be defined based on traffic samples that would absolutely (or only extremely probably) remove the possibility that device a is connected to b. Constraint logic is then used to determine the topology (or topologies) that satisfy the set of constraints so established. This method could be used generally. It could also be used instead of a probabilistic ranking method described later in this specification under section (B1).

It should be noted that the devices in the network can be really discrete (e.g. communications devices) or conceptually discrete (e.g. arbitrarily chosen volumes in a solid). The following is an example list of the things that can be measured and the consequent topologies that can or might be discovered using the present invention. It should be noted that discovering the topology may have value, or determining that the topology has changed or that it is normal or abnormal may also have value. Any of these may be predictive of an event or events, diagnostic of a fault or faults, and/or correlated to a particular model, including the discovery of the mechanics of processes and models.

a: Electrical activity in neurons or neuronal regions of the brain allowing the topology of the brain used for various activities to be determined.

b: Electrical signals and information transfers in communications systems: data, voice and mixed forms in static, mobile, satellite and hybrid networks.

c: volume flow of fluids: for plumbing; heating; cooling; nuclear reactors; oil refineries; chemical plants; sewage networks; weather forecasting; flows in and from aquifers; blood circulation (such as in the heart); other biological fluids; sub, intra and supra tectonic flows of lava, semisolids and solids.

d: flow of information or rates of use in software systems and mixed software hardware systems allowing the logical and physical topology of software and hardware elements and devices to be determined.

e: device flows: fish, bird and animal migration paths; tracks and routes of vehicles;

f: heat flow: particularly a surface or volume up into elements, one can describe the flow vectors of heat through the elements and hence deduce a probabilistic flow network. The measured attribute could be direct (e.g. black body emission signature) or indirect (e.g. electrical resistance).

g: nutrient and nutrient waste flow: certain nutrients get consumed more rapidly by rapidly growing parts (e.g. cancers) than by other parts. The flow of nutrients will tend to be abnormal towards such abnormal growths and similar the flow of waste will be abnormally large away from them.

h: the automated discovery of the network topology enables a number of applications in data communications: e.g. direct input of the topology with the traffic measurements to a congestion prediction package.

i: the discovery of economic and system operational models, leading to discovery of ways to change, influence, direct or improve them.

j: In general: biological diagnosis, model discovery and validation; volcanic eruption and earthquake prediction; refinery operations startup modelling for replication; operational efficiency improvements by spotting bottlenecks and possibilities for shortcuts (in organizations and systems).

It should be noted that if the time of flight between devices is a constant or approximately constant for a given path between two devices, then this time of flight can be found and the device connection figure of merit improved by allowing for it. The traffic measured at one device will be known to be detected at a fixed offset in time to the identical signal at the other device. In some cases, when major fluctuations in the activity common to two devices occur with similar time period to the time of flight between these two devices, this improvement in the figure of merit will be dramatic. The following variation in design allows for times of flight between pairs of devices to be the same for all pairs of devices, or for times of flight between pairs of devices to be different for some or all pairs of devices.

An extra complete external loop is added to the comparison of the traffic patterns of two devices A and B. This loop is outside the time alignment loop. The entire figure of merit (fom) calculation for A and B is given an extra parameter, the fixed time offset from A's measurements to B's. This is used during time alignment. This time offset is then treated as the sole parameter to be varied in an optimization process that seeks to make the fom of A to B as good as possible. This optimization will in general not be monotonic. Suitable methods from the field of optimisation can be used: eg: Newton's, or Brent's or one of the annealing methods: see, for example: R.P.Brent: "Algorithms for minimization without derivatives", Prentice-Hall, 1973.

Another method for computing the fom is the Pearson's correlation coefficient.

Reactive analysis can be carried out in order to determine the fom. For example, two objects are connected if they share the same reaction to activity, not just the same activity.

If the connection between two objects caused them to emit a signal which was characteristic of the content, form or type of connection, the emitted signals could then be used to determine which devices were connected to each other, for example, if the connection between two devices caused them to emit a spectral shape determined by the content of the connection. The different spectral emission shapes (profiles) then allows determination of the fom of possible connections.

The dimensionality of activity or reaction can also be used to determine the fom. Each dimension (eg: sound) can be assessed as being present or absent (ie: a binary signal). If several dimensions (red light, green light, sound, temperature over a limit etc.) are measured one gets a set of binary values. The binary values (perhaps simply expressed as a binary code and so easily represented and used in a computer) can then be compared to determine the fom of possible connections.

Stimulation of idle devices in a network allow their connections to be identified directly. The present invention can determine that a device is idle because the volume of traffic in or out of it is insignificant. It can then instruct a signal burst to be sent to or across this device in order to generate enough traffic to accurately locate it in the network. Their location will be remembered unless the devices are indicated to be in a new location or they cease to be idle. Idleness can be expressed as having a mean level of traffic below some cutoff to be chosen by the operator. A convenient value of this cutoff is 5 units of activity per sampling period as this provides the classic chi-squared formulation with sufficient data for its basic assumptions to be reasonable accurate. (See for example: H. O. Lancaster: "The Chi-Squared distribution", Wiley, 1969.)

The stimulation of idle devices can continue until they are not idle anymore. In this way a series of low level signals, which do not significantly add to the network load, can be used to help in the discrimination of the objects and discovery of the topology. These low level signals can be well below the background traffic level of the network, especially if the cumulative sum method of section 14 is used. Once the locations of idle devices in the network have been found, they can be allowed to become idle once again.

The method just described can also be applied to distinguish between two pairs of connections. Perhaps the traffic patterns on the connections are extremely similar. The signal burst is sent to one path and not the other. This will result in discrimination between them. Repetition of this process may be necessary. Once discrimination has been achieved it can be recorded and remembered.

This can be activated randomly as well and applied in parallel to multiple targets. If applied in parallel the signal sizes need to be defined so that they are unlikely to be similar. This can be achieved in two ways:

The smallest significant signal has size M. It is used between one source and one target (eg: the NMC and some target). The next signal chosen, for transmission during the same sampling period, is of size 2M. The next has size 4M and so on, in a binary code sequence (1,2,4,8,16 ... ). The advantage of this is should a device be on several paths between sources and targets it is impossible that the added signal combine to equal any other combination of any different set of combined signals. This binary coding of the signal size also allows multiple investigations as will be described later to be carried out in parallel.

The signals sent can have random sizes. The signals are sent to a different set of randomly chosen idle targets each sampling period. This method would discriminate between targets and allows many more objects to be targetted in parallel than the method described immediately above.

To avoid comparing devices which are extremely unlikely to connect based only on the mean traffic levels so far detected on them, Let:

Ma=mean traffic on device a (since startup of Ariadne)
Mb=mean traffic on device b (since startup of Ariadne)
Va=variance in the traffic on device a
$D(a,b)=(Ma-Mb)^2/Va$ The mean value of the traffic is found for all devices. The devices are then sorted with respect to this mean traffic level.

The first part of the search starts for device a at the device with the mean traffic just above Ma. This search stops when the D(a,b)>1.0. Devices with values of M>Mb will now not be examined.

The second part of the search starts for device a at the device with the mean traffic just below Ma. This search stops when D(a,b)>1.0. Devices with values of M<Mb will now not be examined.

Example of this with a Sorted M List:

| Index | M |
| --- | --- |
| 1 | 10 |
| 2 | 12 |
| 3 | 13 |
| 4 | 25 |
| 5 | 30 |
| 6 | 38 |
| 7 | 40 |
| 8 | 49 |
| 9 | 57 |

Let device "a" be index 5 and have variance Va=13, Ma=30.

The first part of search compares device 6 against device 5 and then device 7 against device 5. Device 8 has Mb=49 and $(49-30)^2/13$ is >1.0, so device 8 is not compared and no devices above 8 are compared with device 5.

The second part of search compares device 4 against device 5. Device 3 has Mb=13 and $(13-30)^2/13$ is >1.0, so device 3 is not compared and no devices below 3 are compared with device 5.

The computational complexity of the sort (Quicksort or Heapsort) is N logN where N is the number of devices in the network. This will now often be the dominant computational load in the entire algorithm. It should be noted that the worst case of Quicksort is $N^2$ whereas Heapsort is about 20% worse than N logN. In this problem where the sort will need to be carried out at the end of each sampling period, Heapsort will generally be better than Quicksort except for the first occasion of sorting. This is because Heapsort generally performs better on a list which is already perfectly or near perfectly sorted. Since the mean levels of traffic on devices tend not to change much as the number of sampling periods increases, this means that the sorted list becomes more and more stable. Other sorting methods may be better than either Quicksort or Heapsort or adequate for some applications. They are indicated as being suitable for some applications.

This technique of presorting a list of objects and then comparing only near neighbours is far more widely applicable. Mathematically it provides an NlogN computational complexity solution to an $N^2$ computational complexity problem. This solution is in many cases exact and in others is approximate.

In some networks it may be possible to know in advance geographical regions that contain sets of devices. The devices in one area need not be considered possible connection candidates to devices in any non-adjacent area. This would allow significant reductions in computational complexity. It might also be possible to identify only a few devices in each (eg: routers) which are possible candidates for connection to devices in other areas, regardless of contiguity. This would further reduce the computational complexity.

Underlyincr Theory of Topological Comparison:

The following treatment shows how many samples are needed in sequences to minimally discriminate between the connections in a network, under some conditions. Let there be N traffic sequences measured in the network, with M samples in each sequence. We want to connect the N sequences in pairs, i.e.: we compare each of the N sequences with N−1 other sequences. If there were no restrictions placed on these comparisons we would carry out N(N−1)/2 comparisons.

We now want the sample sequences to be long enough to provide far more possible sequences that the comparisons would consider. If we assume that each sample selects either a signal Up or a signal Down then the number of possible samples sequences in a sequence of length M is $2^M$.

If we want to have no more than 1 connection mistaken in X connections, $$2^M > X.N(N-1)/2$$

eg: if X is 1000 (ie: no more than 1 mistake expected in 1000 comparisons) and N is 100 then $$X.N(N-1)/2 = 5.05\ 10^6$$

so M>=23.
In other words:
if one uses a sample sequence of length 23 one should expect to correctly connect 100 connections drawn randomly from the possible population of binary sequences with an accuracy of 1 mistake expected in 1000 connections.

Note that the binary sequences (Up and Down) correspond to using a variance for each sample which corresponds to the square of that samples's offset from the mean.
  i.e.: if s(i) is the sample value at the i'th position and m is the mean of s(i), i=1 . . . M $$v(i)=(s(i)-m)^2$$

Since this is a very conservative expression of the variance, one would expect that this estimate of the minimal number of samples m is also conservative.

Deducing the presence of an unmanaged device:

Let the devices A, C and D in (6) below be managed (i.e.: traffic samples are taken from them.) Let device B be unmanaged. From time t0 to t1 all the traffic from A goes to D (via B of course). During this time Ariadne would believe that device A is directly connected to D. From time t1 to t2, all the traffic from A goes to C (still via B). Now it would be believed that A is directly connected to C. To accommodate the two hypotheses the existence of a cloud object is postulated (which in practise is object B) as in (7).

In communications networks the two hypotheses (A--C and A--D) would only be inconsistent if the communications interface (i.e.: port) on A were the same for the two connections.

Alternative Forms of Computing the Most Probable Connection From a Series of Hypotheses:.

Over many sampling periods a series of hypotheses could be considered about which device (from a set Bi: i=1 . . . n) was best connected to a device A. The best method for discrimination would be to use the maximum number of samples in comparison. However, if this is impractical (e.g. because of an impossibility to store all the samples) various methods could be used to combine the figure of merit from an earlier sequence to the figure of merit from a current (non overlapping sequence). One such method would be to take the mean of the two figures of merit.

e.g.: if F(x,y,n) be the fom between x to y using sample sequence 1.
let:

F(A,D,1)=0.10

F(A,D,2)=0.71

F(A,C,1)=0.09

F(A,C,2)=0.11

F(A,D)=(0.10+0.71)/2=0.4

F(A,C)=(0.09+0.11)/2=0.1

Thus A is most probably connected to C, not to D.

The embodiments described above will be referred to generically as Ariadne. The following embodiments will be referred to generically as Jove. Jove is a logical method for discovering the topology of objects.

Jove is a method that can connect subgraphs in a network that would otherwise remain disconnected. These subgraphs are connected by devices or sets of devices that record or report no measures of activity to the system(s) running Ariadne. Jove determines the existence of such objects, where they are in the network and how they are connected to the parts of the network Ariadne can see.

General Concepts:

The general concept is to determine a path by sending a signal from a source to a destination while watching for the traffic caused by this signal on all objects that could be on the path. The signal is chosen to be detectable against the background traffic. The objects on which the signal traffic is detected are now known to be on the path. This information is used to complete connections in the network topology.

1: The process can involve repeated signals, to improve accuracy.

2: The process can be used to verify connections as well as discover them.

3: The signal can be initiated deliberately or a spontaneous signal or signals could be tracked.

4: The sequence in which the objects get the signal can be used to define the sequence of objects in the path. For example, should the signal be sent from device A and arrive at device B before device C, then device B lies on the path between A and C.

5: The known relative depth of objects from the source can be used to define the sequence of objects in the path. Depth from the source is the number of objects which would have to be traversed from the source to reach that object.

Application to Communications Networks:

Jove is a logical method that supplements the probabilistic methods of Ariadne. Jove requests the network management centre computer to send a large burst of traffic across the network to a specified target computer. This burst is large enough that it can be tracked by the routine measurements of traffic on the devices in the network that are being monitored. The devices that are traversed by the burst indicate to Jove the path of the burst. If the burst passes through two subgraphs, a gap exists in the path of the burst due to the presence of a device that does not report its traffic. Jove then deduces which two devices in the network constitute the two ends of the gap and adds a hypothetical object that connects these two ends. For example:

Device NMC is the network management centre computer, which is running Ariadne. (Jove is a part of Ariadne). In the network shown as (1) below, devices A,B,C,D,E and G are in the network and are reporting their traffic to Ariadne. Device F is in the network but does not report its traffic (eg: it is unmanaged). The burst sent from NMC to E is detected by Jove on the lines as follows:

1:NMC-A
2:A-B
3:B- somewhere
4:from somewhere to D
5: D-E

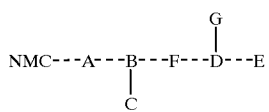

(1)

Jove executes the network layout algorithm twice, once with the NMC as top and once with the device E as top, giving it the following two subgraphs:

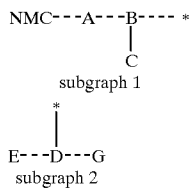

(2)

Jove finds the two connections (indicated by *) that carry the burst in subgraph 1 and in subgraph 2 but for which Ariadne has not found another end (ie: a dangling connection). The connections from B and D (labelled *) are such dangling connections. Jove therefore hypothesises that these two connections terminate on an unknown device. It adds such a hypothetical device (a cloud) to the network and so connects the two subgraphs as follows.

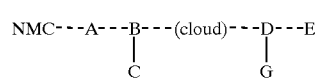

(3)

Adding a Second Cloud or Reusing an Existing Cloud:

Usually the port from a device to a cloud is known. This is due to observing the burst on the line leading from that port. Should the same port on the same device be used to connect to second hypothesised cloud, the second cloud is not added and the same cloud is reused. The following example describes this with reference to the network shown in (7).

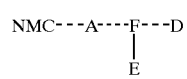

(4)

In this example all devices except F are managed. Jove first sends a burst to D and deduces the graph:

NMC--A--(cloud)--D    (5)

Jove then sends a burst to E and finds that the connection from A--(cloud) uses the same port for this burst as for the earlier one. Therefore the cloud already added also connects to E.

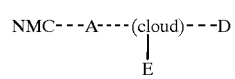

(6)

Should Jove have found a different port was used from A to connect to E, the following graph would have been constructed.

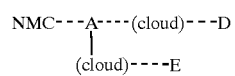

(7)

Variations, Exceptions and Target Selection:

Various exception conditions and variations on this logic are possible. How Jove selects targets is described below.

Isolated Device on a Burst Path:

Let all the devices in the network shown in (1) above be managed except B and D. C, F, G and E are now isolated managed devices. E was chosen as a target. The two subgraphs produced are as follows:

NMC---A--- subgraph 1

E-- subgraph 2    (8)

The burst from the NMC is observed to pass through NMC, A, F and E. Since F is not in either subgraph it is now selected as the target instead of E. We now get the two subgraphs:

NMC---A--- subgraph 1

--F-- subgraph 2     (9)

The burst passes from NMC to A and out and is observed to enter F. The two dangling connections are connected as follows.

NMC---A---(cloud)---F     (9a)

Now Jove has connected F, it can return to attempt to connect E again. It already knows that the burst from the NMC has been observed to pass through NMC, A, F to E. Therefore E must be attached to F as follows.

NMC--A--(cloud)--F--(cloud)--E     (10)

In (10) the two clouds are known to be different. The burst travels into and out of F and therefore, unless the network has included F as an unnecessary loop on a route, F must be essential in connecting the two clouds.

This logic of dealing with an isolated device on a burst path can be generalised. Should several such isolated devices turn up, or should one or more subgraphs appear in a route, these problems will be solved before Jove returns to the original problem. In this way Jove connects the network together in parts, working out from the NMC towards the original chosen target. This logic results in the core of a communication network being constructed first. Since most routes from the NMC to other objects in the network lead through this core, this results in more of the network being discovered per Jove signal burst. Furthermore, should the graph so far constructed by Ariadne and Jove be displayed while Jove is operating, this allows the operator to see the core of the network first, which is often more important to the network operator than isolated parts of the periphery.

An alternative response to the detection of an isolated device on a burst path is as follows. The original target analysis is abandoned and the problem for the isolated device (as described above) is solved. Now a new target is chosen. The new target chosen could be the same as the original one or might be different. This allows Jove to operate with more simplicity. This could be appropriate in certain classes of network.

Dropping of Traffic Measurements:

The NMC sends requests to managed devices to ask them to tell it about their traffic counts (which is part of Ariadne's repetitive polling procedure). Sometimes these requests are lost and sometimes the replies are lost. In either case there is a gap in the traffic sequence recorded for a device or devices. The drop rate is defined as the percentage of requests that receive no corresponding response due to loss of either the request or the response. In some communications networks the drop rate reaches levels of several tens of percentage (eg: with an average drop rate of 40% only 60% of traffic measurements are complete).

Once Jove has instructed the NMC to send out a burst it will wait until all devices on both subgraphs have responded with traffic measurements before it continues its analysis. In addition Jove will wait zero or more sampling periods depending on the average drop rate. This delay allows devices not in either subgraph to respond and so consequently be identified as having received the burst.

Should the drop rate exceed a threshold (set by the operator) then Jove will suspend operations until the drop rate is below that threshold. Since drop rates tend to rise as the network becomes busy this prevents Jove from adding to the potential overload problem due to it generating traffic bursts.

The Nature of the Burst:

A sequence of bursts of PING or other packs can be used. Pings cause a response in the target kernel and the response of an equal number of packets. In both cases the packets are small. The major benefits of using Pings are the small size of the packets involved, the lack of impact on the CPU load of the target machine and their generality. The small size of packets reduces the load on the devices in the network on the route. The lack of impact on the CPU of the target machine is because the Ping is responded to by the target kernal, not by some application in the target machine. Finally, many network devices respond to Pings but do not collect nor report any traffic measurements. That means Jove can identify and locate devices in the network that Ariadne can not.

The NMC is careful to spread this burst of packets out enough so that routing devices in the path will not be overloaded but not so much that dynamic rerouting will cause significant portions of the burst to travel along a different route.

The bursts could be sent every sampling period and the sequence of magnitudes of bursts chosen to optimally be discriminated against the measured signal patterns in the network or predicted signal patterns. A burst sequence is far more readily recognizable than a single burst.

Different sequences of bursts can be made to both readily discriminatable against the network signals and with respect to each other. Generally these sequences preferably form a set of orthogonal signals.

|      | sampling period |    |    |                                  |
|------|-----------------|----|----|----------------------------------|
| Set: | 1               | 2  | 3  |                                  |
| A:   | A1              | A2 | A3 | (eg: 1 is the burst sent in      |
| B:   | B1              | B2 | B3 | sampling period 1 in sequence A) |

The values of the bursts in A and B should be chosen so that A and B are both orthogonal and are adequately discriminatable against the network traffic count signals in all the devices under consideration.

Target Selection:

Ariadne knows that Jove logic is needed when Ariadne uses the network graph layout algorithm and at least two subgraphs are found to exist. Ariadne chooses as its subgraph 1 the subgraph containing the NMC. It chooses as subgraph 2 the subgraph with the most devices. The device at the top of subgraph 2 is chosen to be the target of the burst.

The Size of the Burst:

Ariadne examines the changes in traffic counts from one sampling period to the next for all devices in the network. It sets the level of the burst to be significantly larger than any change in the traffic count experienced in the last M (eg: M=15) sampling periods. Should this burst be computed to be less than a minimum (eg: 500 packets) it will be set to this minimum. Should this burst be computed to be greater than a maximum then Jove will be disabled for a period of time (eg: 15 sampling periods) as the network is presently too unstable or busy for Jove to be used accurately without possibly impacting user response due to the traffic generated by the Jove bursts.

The Timing of Bursts:

Bursts need to be sent during a period when no traffic measurements are being made. Otherwise a burst may fall partly into one sampling period and partly into another, for some devices and not for others. To ensure that a burst does not overlap traffic measurements, no request for such measurements are sent out for a period of time before a burst is sent and none for a period of time after a burst has been sent. The gap before makes reasonably sure that all devices have completed measurements before a burst is sent. The gap after makes reasonably sure that no requests for the next measurement overtake a burst.

The Uses of Jove in Communications:

Jove can determine how unmanaged but Pingable devices are attached to the network should any managed device lie beyond it. Jove can therefore deduce the existence of connections such as those that are provided by third parties to crossconnect LANs into WANs. Further, Jove can be used to determine the existence of a single cloud that connects multiple devices. Such a cloud could be for example, an unmanaged repeater or a CSMA/CD collision domain on a 10Base2 or 10Base5 segment.

Multiple Parallel Bursts:

The Jove logic can operate on several detached subgraphs at once. The burst sent to subgraph 2 is chosen of size M. That sent to subgraph 3 is of size 2M. That sent to subgraph 4 is of size 4M and so on (1,2,4,8,16 . . . ). As noted before, this binary form of combination allows Jove to distinguish devices that have received bursts of different sizes.

Automatic Adjustment of Burst Size Based on Burst Resolution:

A burst is designed to be readily recognized above fluctuations in the background traffic. Suppose that the average change in background traffic from one sampling period to the next be 50 packets and that the burst size was chosen to be 500 packets in the first sampling period. The burst will be recognized on average to be of size 500+−50 packets, ie: with a "fuzz" of 10%. As this fuzz gets larger, the chance of Jove wrongly recognizing a burst in a device due to a random change in traffic also gets larger. Jove therefore should try to increase the burst size when it detects an average or maximum fuzz levels to be above a certain cutoff. Moreover, should the fuzz be too large, Jove will not accept that this burst was significantly above the background and will not use the results from this burst in any reasoning. Again, should Jove try to increase the burst size above some threshold, Jove logic will be suspended for some period of time until the network was hopefully less busy or less bursty.

When Jove recognizes the average or maximum fuzz levels to be very low, then Jove realizes that the burst is unnecessarily large. That means the burst size can be reduced. This has two benefits. First the burst has less impact on the network traffic load and also it may allow more multiple Joves (as described earlier) to run in parallel. However, the burst size may not be reduced below some threshold, to reduce the risk of random small changes in the network traffic causing loss of Jove reasoning for a sampling period.

For example, if the signal change from one sampling period to the next for a device was C and is D when a burst of size B is put through:

the error in detecting the presence of the burst B is |C−(D−B)|.

For example, if C was 220 pkts, D is 1270 pkts and B is 1000 pkts, then the error in B is 50 pkts in 1000 (or 5%).

Another Form of Jove Logic:

Depth: The number of devices traversed between the source and an object is defined as Depth.

This is often called the number of hops.

As described above Jove looks for devices which either received a burst from some unconnected link or sent a burst out over an unconnected link. Should this detailed information (eg: port level of activity) not be measured, then Jove can deduce the depth in the subgraph and choose the deepest object which had a burst. This can mean choosing the object most distant from the NMC which received the burst. It can mean the object most distant from the target.

For example, consider subgraph 1 and subgraph 2 in (12) below. In subgraph 1 the NMC has depth 0 (ie: it is zero hops from the NMC). Device A has depth 1, devices B has depth 2 and device C has depth 3. Jove knows these depths from the topology of this subgraph. The burst sent from the NMC to device G passes through the NMC, A and B (but not C). Since B is the deepest device in subgraph 1 that carries the burst, B is probably the point of connection to the subgraph 2.

In subgraph 2 device G is at the top (as it was chosen as the target). Device D has depth 1 and device E has depth 2. Only D and G receive the burst. Since D is the deepest device in subgraph 2 to have received the burst, it is probably the point of connection to subgraph 1.

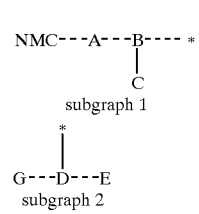

(12)

The choice of B in the NMC subgraph (subgraph 1) can optionally be checked by sending a burst to the next deepest object which received a burst in that subgraph. This is device A in the example above. Should the object chosen as deepest (eg: B) not receive this burst, it is truly the deepest. Should it receive the burst then it should not be considered as the deepest and the next deepest should be checked in turn. This checking can iterate until the correct object that should connect to the cloud is found.

The choice in the second subgraph can also optionally be checked by sending a burst to it (eg: to D). Should only that object in the second subgraph (eg: subgraph 2) receive the burst, then it is truly the point of connection to the cloud. Should any other object in the second subgraph receive this burst, then the original choice of deepest in this subgraph must be rejected and the second deepest tried. Again this checking can iterate until a burst sent to an object in the second subgraph causes only that object in the second subgraph to receive a burst.

Network Layout Algorithm:

The following algorithm allows the network topology to be laid out in an orderly manner with one device having been chosen to be at the top. The connections between all devices in the network that are managed and that can be deduced by Ariadne are assumed to have been deduced. One device is defined to the network layout algorithm as being the TOP device.

Step 0: Define all devices as having their level in the network undefined.

Step 1: The TOP device is allocated a level of 1.

Step i=2 . . . N: Choose all devices that connect to devices at level i−1 and which have undefined levels. These devices are given level i.

Halt when no more devices can be allocated.

This algorithm will terminate with all the devices connected to the subgraph in the network that contains the TOP device. If the network is topologically continuous, then the subgraph will contain all the devices in the network. Such topologically continuity exists when all the devices are managed and sufficient connections have been discovered by Ariadne.

This network layout algorithm is used in Jove and in the network graph layout algorithm.

Network Graph Layout Algorithm:

The aim here is to lay out the network topology in a way that makes sense to human beings. When displayed the network will have the most important communicating objects towards the top of the display. Less important communicating objects will be lower down. Specifically, the device which most frequently plays a role in communications paths between pairs of devices is put at the top.

The network graph layout algorithm is used to help display the network topology and in assisting logical methods of determining the network topology.

Allocate all devices to subgraphs:

0: Define all devices as being in no subgraph.
   1: i=1.
   2: Choose a device at random which is in no subgraph.
   3: Define this device as TOP and use the network layout algorithm.
   4: All devices in the subgraph under and including TOP are designated as being in subgraph i.
   5: i=i+1.
   6: Should any devices still remain not in any subgraph, go to step 2.
      Note: a common variant in step 2 would be as follows.
      2: If i=1 then choose the device=NMC else choose a device at random.
   This means that subgraph 1 contains the NMC as its top.

Find the Routing TOP of the Biggest Subgraph:

The subgraph with the most devices is the biggest subgraph. Determine in this subgraph the relative importance in routing of each device. The device with the most importance in routing is the TOP of that subgraph.

0: determine the routes from all devices to all devices in the subgraph. Use the standard data route cost exchange method to do this by pretending that all devices in the subgraph are data routers. This method and variations are explained below.
   1: define all devices in the subgraph as having zero routing counters.
   2: choose a pair of devices at random in the subgraph and find the shortest path between them.
   3: all devices on the path and the two ends have their routing counters incremented by 1.
   4: repeat steps 2 and 3 M times (eg: M=1000)
   5: examine the routing counters of all devices in the subgraph. The device with the biggest counter is the most important in routing. It is defined to be the TOP device. Should a tie occur, the first device encountered with the biggest count will be the TOP device. Alternatively, all devices sharing or near the biggest count are placed on the top level.

Data Router Cost Table Exchange Method: Constant Cost Per Hop:

The aim is to find the cost of reaching any device K from any device J. A table that describes this cost can be used directly to find the shortest route from any device to any device.

Define:

$C(J,K)$ be the cost of reaching device K from device J.
   N=number of devices.
   1: Set all $C(J,K)$ to be unknown: J=1 . . . N, K=1 . . . N
   2: Set all $C(J,J)=0$, J=1 . . . N.
   3: For each device J define the cost of reaching its immediate neighbours K as being cost 1: $C(J,K)=1$ for the set K of neighbours of each J, J=1 . . . N
   4: For all J=1 . . . N, let K be the set of neighbours of device J, for all devices M: If $C(K,M)$ is not unset: then if $C(J,M)>C(K,M)+1$ or if $C(J,M)$ is unset, then $C(J,M)=C(K,M)+1$
   5: If any change was made to any C value in the entire step 4, repeat step 4.

Generally in the Ariadne and Jove logic devices are network devices or graphic devices.

Data Router Cost Table Exchange Method: Varied Cost Per Hop:

The aim is to find the cost of reaching any device K from any device J. The table that describes this cost can be used directly to find the shortest route from any device to any device. In this variation the cost of passing from a device J to a neighbouring device K depends on the communications traffic capacity of the line connecting J to K.

Define:

$C(J,K)$ be the cost of reaching device K from device J.
   N=number of devices.
   1: Set all $C(J,K)$ to be unknown: J=1 . . . N, K=1 . . . N
   2: Set all $C(J,J)=0$, J=1 . . . N.
   3: For each device J define the cost of reaching its immediate neighbours K as being a cost inversely proportional to the line traffic capacity of the line from J to K:
      $C(J,K)=1/$(line traffic capacity for the line j to K): for the set K of neighbours of each J, J=1 . . . N
   4: For all J=1 . . . N, let K be the set of neighbours of device J, for all devices M:
      If $C(K,M)$ is not unset: then
      if $C(J,M)>C(K,M)+C(J,K)$ or if $C(J,M)$ is unset, then $C(J,M)=C(K,M)+C(J,K)$
   5: If any change was made to any C value in the entire step 4, repeat step 4.

Incomplete Traffic Capacity Knowledge:

Should a line capacity be unknown, several alternative methods can be used to approximate it.

1: Where any line capacity is unknown, use the lowest line capacity of any line connecting to or from that device.
   2: Where any line capacity is unknown, use the average line capacity of the lines connecting to or from that device.
   3: Where any line capacity is unknown, use the average line capacity of all the lines nearby or in the network at large.
   4: Where any line capacity is unknown, use the standard value set by the operator.

Other Applications:

This algorithm will display any topology of objects. The routing counter could be replaced by a traffic volume counter or some other measure.

Any of the family of methods for finding near optimal paths between objects can be used. As well as the well known communications methods deployed in voice and data networks there are some variations that may be suitable in other applications, such as those described in the following references.

1: P. P. Chakrabarti: "Algorithms for searching explicit AND/OR graphs and their application to problem reduction search", Artificial Intelligence, vol 65(2), pp329–346, (1994)
   2: M. Hitz, T. Mueck: "Routine heuristics for Cayley graph topologies", Proceedings of the 10th Conference on AI and Applications, (CAIA), pp474–476, (1994).
   3: A. Reinefeld, T. A. Marsland: "Enhance iterative-deepening search", IEEE Transactions on Pattern Analysis and Machine Intelligence, Vol 16 (7), pp701–710, (1994).

4: W. Hoffman, R. Pavley: "A method for the solution of the Nth best path problem", Journal of the ACM, vol 6(4), pp506–514, (1959)

5: M. S. Hung, J. J. Divoky: "A computational study of efficient shortest path algorithms", Computers and Operational Research, vol 15(6), pp567–576, (1988)

6: S. E. Dreyfus: "An appraisal of some shortest-path algorithms", Operations Research, vol 17, pp395–412, (1969).

Alternative fom Method Related to Chi-squared:

Define:
    si=value of signal from device s at time i
    ti=value of signal from device t at time i
    vi=variance of signal from device s at time i let:

$$\beta = \Sigma((si-ti)2/vi)$$

The chi-squared method is a particular form of this general expression where vi is approximated by si (or by the sum of si and ti, depending on normalization).

An alternative method is to explicitly estimate vi from the series of measurement si. This method has the great advantage that it does not make the same assumptions that are required for accurate use of the chi-squared formulation. Methods for estimating the variance (vi) include the following:

find the variance of the sequence of measurements, vi=this variance:
        fit the same or similar or other function as used in time alignment interpolation to the sequence of measurements, and set $$vi = (si - \text{estimate of } Si)2$$

Use the Sum of the Signal so Far:

S In earlier formulations:

Si=value of signal from device s at time i
ti=value of signal from device t at time i For example, should the traffic counts at times 1–3 be as follows:

1: 17
2: 21
3: 16

Instead of using these Si counts, instead use the sums to this time:

$$S_i = (\Sigma s_j, j=1 \ldots i.) - S_1$$

Si measures the total activity on device s since the start of recordings. The same time alignment methods are used as before. This measure of activity has several advantages. Over a long sequence of measurements the patterns from two very slightly different signals will become more and more pronounced. In addition, should some of the signals in a sequence be lost (e:SNMP packet loss) and should the signals recorded be not changes but sums to date, this method will not lose that signal entirely. For example: suppose two devices record their total activity to date as follows (where the symbol ? means no measurement was made):

| time: | 1 | 2 | 3 | 4 | 5 | 6 | 7 |
|---|---|---|---|---|---|---|---|
| A: | 12 | 26 | 38 | ? | 64 | ? | 89 |
| B: | 11 | ? | 35 | 50 | ? | ? | 91 |

Should one try to compare the changes in traffic activity one will have only the following measurements available, none of which overlap so no comparison of devices A and B is possible.

| time: | 1 | 2 | 3 | 4 | 5 | 6 | 7 |
|---|---|---|---|---|---|---|---|
| A: | ? | 14 | 12 | ? | ? | ? | ? |
| B: | ? | ? | ? | 15 | ? | ? | ? |

One could, instead of measuring the total volume of traffic since Ariadne started, just measure the volume over the last M sampling periods. This has several advantages for some networks or implementations: for example:

1: Should the total volume of traffic so far on one or more paths approach or exceed the number of significant figures of storage of the volume.

2: Should a device in the network have its counters reset, one clearly wants to perform the comparison with respect to this device only since this reset occurs. To prevent penalising other comparisons between other devices, one may want to perform all comparisons from the time of reset forwards.

The description above relates to methods which exploit the measurement of traffic. However, the routing information can also provide valuable information on the nature of the network, as will be described below. Further, the conclusions drawn from multiple methods can be integrated. The method of integration is generally applicable to all topological problems, and is not restricted to communications networks. However communications networks will be used as examples in the description below.

Information used to route data through a communications network can be used to determine the physical topology of the network, for example, ARP routing tables, RMON tables, bridge tables, link training and source address capture tables, IP addresses and masks. Methods of using such information to determine network topologies are described below.

(A1) Source Address Information

This embodiment facilitates the location of unarranged devices in communication networks. Certain classes of devices which pass data (e.g. repeaters) can record, for every input port, the MAC address of the last frame transmitted to that port from the device on the other end of the communications line connected to that port. This information is termed the 'MAC source address'. This MAC source address is, for certain devices, stored in the MIB (the management information base for that device) and can be read by the system attempting to map the network. In accordance with this embodiment, this MAC source address should be read periodically and the traffic count on that communications line into that port should also be read periodically. As shown in the flow chart of FIG. 4, the following data X and N should be collected.

X: whether the MAC source address always remained the same.

N: the number of occasions that the traffic count has been observed to have changed from one reading to the next.

If the MAC source address always remained the same (i.e. X is true), then the probability that the port on this repeater is directly connected to device with the MAC address given by the MAC source address recorded depends, among other variables, on the value of N. In practice one can estimate that should N exceed a cutoff (e.g. 50) then the probability that the port on this repeater is directly connected to a device with the MAC address given by the MAC source address recorded is acceptable, in the absence of any other information.

Should the MAC source address be observed to vary, then the set of devices identified by the set of MAC sources addresses recorded are indirectly connected to the port on the device which is receiving the frames with these MAC source addresses. Typically this set of devices will be represented in the physical network topology as being connected via a cloud as described above with reference to JOVE, to this port.

(A2) ARP Table and Bridge Routing Table Information

This embodiment facilities the location of unmanaged devices in communications networks.

Address resolution tables in routing communications devices associate MAC addresses with IP addresses for devices which are local to the routing device. These tables are available in the MIBs for such devices. This mapping allows the routing device to determine the output port to be used to route the frame with a given destination MAC address. The list of associated IP and MAC addresses therefore defines a set of devices which are directly or indirectly (but closely) connected to this routing device. These devices, should they not have been located in the network physical topology already, can therefore be connected via a cloud to the routing device.

Since for some devices the routing tables only contain the most recently updated M entries (e.g. 1024) the tables should be periodically reread in order to extract the maximum amount of potential connection information.

This method is protocol independent. For example, in a bridging device a list of MAC addresses may be available. Therefore the MAC address is generally available to the processor determining the topology, as well as an associated single or multiple protocol second identification (e.g. IP as above) in particular cases.

(A3) IP Subnet Masks

In accordance with another embodiment, the attachment of subgraphs containing portions of a subnet can be indicated, and can locate unmanaged devices in communications networks.

The IP address of device i is defined as a sequence: IP(i)=207.181.65.1

Routing devices should contain a readable mask field in their MIB which has the following property:

for all devices with a subnet:

(IPI(i) AND mask=(IP(j) AND mask) for all devices i and j in this subnet.

This implies that should j not have been located by any other means in the physical network topology, it can be indicated as being connected via a cloud (i.e. some unknown device or devices) to another or other devices i.

This method in general can be used to locate devices in a network using protocols other than IP.

(A4) Link Training Information

Some devices include protocols that allow them, by exchanging address information across each interface in the device or other selected interfaces, to determine the address of devices connected to each or only selected interfaces. This process is termed 'link training'. In some devices this information about the connections on all or some interfaces is held in the MIB or otherwise. This information can be collected by the Ariadne system using SNMP or another means. Each connection defined by link training can be assigned a standard probability and then combined using the algorithm described in Bi to be integrated into the other methods.

(B1) Integration of Methods

A set of methods may propose different connections in a network. For every device only the most probable connection should be accepted and used, and then only if the probability exceeds some threshold. If a method does not directly produce a quantitative estimate of probability, this quantitative estimate may be deduced either by experiment or by heuristic means.

For the routing methods describe above an arbitrary ranking of probabilities may be used. In practical experiments on several different networks (of size from a few tens of devices to many thousands of devices the following ranked probabilities proved best at determining the correct network topology.

Defining:

$W=Q/L^*$ (refer to subsection m, above) and selecting only trafficated connections with $W<0.1$ and $L^*>=45$:

Most Connection Probability to Least Connection probability:

1. Traffic indicated connection with $W<0.1$ and $L^*>=45$:
2. Jove indicated direct connection:
3. Jove indicated connection via clouds:
4. MAC source address indicates a single connection and at least 45 measurements of traffic indicated frames arrived at the indicated port on the selected device.
5. MAC source addresses indicating multiple devices connected via a cloud to a single device.
6. ARP tables and bridge tables indicating multiple devices connected via a cloud to a single device.
7. Failing all other forms of connection: connection via IP subnet masks, if available.

A person understanding this invention may now conceive of alternative structures and embodiments or variations of the above. All of those which fall within the scope of the claims appended hereto are considered to be part of the present invention.

We claim:

1. A method of determining a connection between devices comprising:

(a) determining the probability of said connection using a method which would indicate said connection with highest acceptable probability, (b) in the event step (a) fails, determining the probability of said connection using a method having a lower acceptable probability, (c) in the event step (b) fails, continuously repeating step (b) using methods having successively lower acceptable probabilities of indicating said connection, until a connection is indicated.

2. A method as defined in claim 1, in which step (a) is comprising of defining $W=Q/L^*$, where $L^*$ is a number of measurements used in comparing two sequences of data, one being transmitting by one device and one being received by a receiving device, and Q is probability of similarity computed, for example by an incomplete gamma function $f(Q,L-1)$ and indicating an acceptable probability of said connection in the case of $W<0.1$ and $L^*>=45$.

3. A method as defined in claim 2 in which steps (b) and (c) are, in order of most probability to least probability
  (i) determining a direct connection by sending a signal from a source to a destination while watching for traffic caused by this signal in all objects which could be on the path,
  (ii) determining an indirect connection by sending a signal from a source to a destination while watching for traffic caused by this signal in all objects which could be on the path,
  (iii) I. over at least 45 measurements of traffic indicated frames of data at an input port of a network device, periodically reading a data source address in a network device which stores an address of a data source which has transmitted a last frame entering the network device,
    II. periodically reading a traffic count of data entering the network device,
    III. determining whether the data source address has always stayed the same,
    IV. in the event the data source address has always stayed the same, determine whether the traffic count has exceeded a predetermined threshold,
    V. in the event the result of step (IV) is true, indicate that the data source address identifies with acceptable probability a data emitting device directly connected to the network device,
    VI. in the event the result of step III is false, indicate that a device identified by the data source address is indirectly connected to the network device,
  (iv) use an address resolution table of the network device as the store,
  (v) establish a mask field in a management information base of the network device for all devices in a subset which passes data through the network device having a property (IP(i) AND MASK)=(IP(j) AND MASK), and indicating connection of a device i to a device j for devices in which the property is true.

* * * * *